United States Patent [19]

Breternitz, Jr.

[11] Patent Number: 5,737,576
[45] Date of Patent: Apr. 7, 1998

[54] METHOD AND SYSTEM FOR EFFICIENT INSTRUCTION EXECUTION IN A DATA PROCESSING SYSTEM HAVING MULTIPLE PREFETCH UNITS

[75] Inventor: Mauricio Breternitz, Jr., Austin, Tex.

[73] Assignee: International Business Machines Corporation, Armonk, N.Y.

[21] Appl. No.: 754,595

[22] Filed: Nov. 20, 1996

Related U.S. Application Data

[63] Continuation of Ser. No. 472,360, Jun. 7, 1995, abandoned, which is a continuation of Ser. No. 164,497, Dec. 9, 1993, abandoned.

[51] Int. Cl.$^6$ ............................................. G06F 12/00
[52] U.S. Cl. .................................................. 395/496
[58] Field of Search .................... 364/DIG. 1 MS File, 364/DIG. 2 MS File; 395/401, 402, 403, 405, 444, 445, 446, 447, 454, 484, 496, 376, 381, 382, 383, 800

[56] References Cited

U.S. PATENT DOCUMENTS

| | | |
|---|---|---|
| 4,777,587 | 10/1988 | Case et al. . |
| 4,873,629 | 10/1989 | Harris et al. . |
| 4,888,679 | 12/1989 | Fossum et al. ............ 395/375 |
| 4,951,246 | 8/1990 | Fromm et al. ............. 395/496 |
| 5,109,348 | 4/1992 | Pfeiffer et al. . |
| 5,129,060 | 7/1992 | Pfeiffer et al. . |

FOREIGN PATENT DOCUMENTS

| | | | |
|---|---|---|---|
| 0180237 | 5/1986 | European Pat. Off. .......... G06F 9/38 |
| 0444601 | 9/1991 | European Pat. Off. ........ G06F 12/06 |
| 0570164 | 11/1993 | European Pat. Off. ........ G06F 12/06 |

OTHER PUBLICATIONS

Machine Organization of the IBM RISC System/6000 Processor, pp. 41–43, Jan. 1990, vol. 34, No. 1, IBM Journal of Research and Development, pp. 37–58.

Rope: A Statically Scheduled Supercomputer Architecture, the whole document, 1st International Conference on Supercomputing Systems, Dec. 16, 1985, Nicolau and Karplus.

Instruction Buffer Design, p. 4833, last paragraph, vol. 20, No. 11B IBM Technical Disclosure Bulletin.

Applied Mathematics and Computation 20 (1–2), 1986 pp. 95–110 A compiler–driven super computer, Kevin Karplus and Alexandru Nicolau.

IEEE Computer Society, 1986, pp. 248–253 Getting high performance with slow memory, Kevin Karplus and Alexandru Nicolau.

Primary Examiner—Robert B. Harrell
Attorney, Agent, or Firm—Casimer K. Salys; Lisa B. Yociss; Andrew J. Dillon

[57] ABSTRACT

In a data processing system, a plurality of prefetch elements are provided for prefetching instructions from a group of memory arrays coupled to each prefetch element. A plurality of instruction words are sequentially stored in each group of memory arrays coupled to each prefetch element. In response to a selected prefetch element receiving a prefetch token, the selected prefetch element sequentially recalls instruction words from the group of memory arrays coupled to the selected prefetch element. Thereafter, the selected prefetch element transfers the sequence of instruction words to a central processing unit at a rate of one instruction word per cycle time. In response to a forthcoming conditional branch instruction, a plurality of prefetch elements may initiate instruction fetching so that the proper instruction may be executed during the cycle time immediately following the conditional branch instruction. By coupling a group of memory banks to each prefetch element, and limiting the location of branch instructions to the last memory bank in the group of memory banks, the number of prefetch elements required to implement a data processing system having substantially similar performance to the prior art architecture is reduced. In an alternative embodiment, video memories are utilized to store instruction words, and provide such instruction words to the CPU at the rate of one instruction word per cycle time.

21 Claims, 8 Drawing Sheets

METHOD AND SYSTEM FOR EFFICIENT INSTRUCTION EXECUTION IN A DATA PROCESSING SYSTEM HAVING MULTIPLE PREFETCH UNITS

This is a continuation, of application Ser. No. 08/472,360, filed Jun. 7, 1995, which is a continuation of Ser. No. 08/164,497, filed Dec. 9, 1993, both now abandoned.

BACKGROUND OF THE INVENTION

1. Technical Field

The present invention relates in general to an improved data processing system, and in particular to a method and system for efficiently executing instructions in a data processing system having multiple instruction prefetch elements. Still more particularly, the present invention relates to a method and system for reducing the number of prefetch elements required to implement a data processing system that executes one instruction per cycle time during the execution of multiway branch instructions.

2. Description of the Related Art

Recently, a new data processing system architecture, called of ring of prefetch elements (:ROPE) has been disclosed in an article entitled "Getting High Performance With Slow Memory," by Kevin Karplus and Alexandru Nicolau, published in COMPCON, May, 1986, at pages 248–253. The purpose of the architecture is to provide a data processing system capable of sustaining an instruction execution rate of one instruction per cycle time, even during the execution of multiway branch instructions. Such a data processing system may be useful for processing real-time video and multimedia presentations. This ROPE architecture is illustrated as prior art in FIG. 1.

As illustrated, ROPE architecture 20 includes "M" number of prefetch elements 22, 24, 26, and 28, for fetching instructions from an associated memory bank. The determination of the number of prefetch elements (i.e., the number "M") required for a particular application of the ROPE architecture is discussed below in greater detail. Memory banks 30–36 are each associated with one prefetch element 22–28, respectively, and are utilized for storing instructions only. Separate data memory banks may be provided for storing program variables or other temporary or variable data. An advantage of this ROPE architecture is that memory banks 30–36 may be implemented by memory devices which require a relatively long period of time to fetch data when compared to the cycle time of the CPU which receives the instructions. As utilized herein, "cycle time" means the minimum duration between two successive instruction requests by the CPU.

Once prefetch elements 22–28 fetch instructions from memory banks 30–36, such instructions are placed on instruction bus 38 at an appropriate time determined by logic circuits within prefetch elements 22–28 and control signals on control bus 40. Instruction bus 38 is coupled to data path 42, which is part of CPU 44. Control bus 40 receives control information 46, which may include condition bits and the instruction pointer, from CPU 44.

Instructions stored within memory banks 30–36 may be very large. In some implementations, the instruction word may be 512 bits wide, and include a plurality of fields. One of such fields contains an instruction to be executed by CPU 44. Other fields in the instruction word may contain instructions addressed to one of prefetch elements 22–28, such as a command to initiate a prefetch.

In operation, ROPE architecture 20 is capable of supplying data path 42 with one instruction per cycle time, even after the execution of a multiway conditional branch. One instruction per cycle time is placed on instruction bus 38 by a selected prefetch element. Prefetch elements 22–28 are selected to place an instruction on instruction bus 38 by an "activate" token. Such an activate token is a particular message or bit pattern that signifies permission to place an instruction on instruction bus 38. A prefetch element is not permitted to place an instruction on instruction bus 38 unless that prefetch element holds the activate token. Since only one prefetch element holds the activate token at a given time, only one prefetch element is permitted to place instruction data on instruction bus 38 at any given time.

In a "non-branch" mode of operation, wherein a branch instruction is not currently anticipated within a specified number of cycle times, the activate token is passed from one prefetch element to a next adjacent prefetch element, via control bus 40, continuing in this manner until all of the M prefetch elements have received the activate token, and all prefetch elements have been allowed one cycle time to place a single instruction on instruction bus 38. Once the last (i.e., the Mth) prefetch element has placed on instruction bus 38, the process continues around the ring of prefetch elements, where the first prefetch element is again permitted to place an instruction on instruction bus 38, without allowing a cycle time to pass without placing an instruction on instruction bus 38.

For example, if prefetch element 22 holds the activate token, prefetch element 22 places a single instruction from memory bank 30 onto instruction bus 38, which may then be received by data path 42. Thereafter, the activate token is passed from prefetch element 22 to prefetch element 24, and prefetch element 24 is allowed to place an instruction from memory bank 32 on instruction bus 38 during the next cycle time. Once prefetch element 28 has received the activate token and placed an instruction from memory bank 36 on instruction bus 38, the activate token may be passed around the ring to prefetch element 22. In such a manner, the process of executing non-branch instructions may continue indefinitely.

Because relatively slow memory devices may be utilized to implement memory banks 30–36, prefetch elements 22–28 typically begin the process of fetching an instruction from an associated memory bank several cycle times before that prefetch element receives the activate token and is required to place the fetched instruction on instruction bus 38. Therefore, a "prefetch token" is utilized to initiate a memory access by a selected prefetch element holding such a prefetch token. Prefetch tokens are passed to prefetch elements several cycle times before a prefetch element receives the activate token. Thus, in non-branch instruction execution, the prefetch element holding the prefetch token precedes the prefetch element holding the activate token, in the ring of prefetch elements, by a number of prefetch elements at least equal to the number of cycle times required to fetch an instruction from memory banks 30–36.

For example, if prefetch element 28 holds the activate token, and is currently placing an instruction on instruction bus 38, the prefetch token is typically located several prefetch elements ahead in the ring of prefetch elements. Thus, a prefetch element, such as prefetch element 26, holding the prefetch token may begin fetching an instruction from memory bank 34 three cycle times before the time the activate token may be received by prefetch element 26. The number of prefetch elements by which the prefetch token precedes the activate token depends upon the speed of memory utilized in memory banks 30–36 and the cycle time of the CPU. Typically, the prefetch token precedes the activate token by a number of prefetch elements equivalent to the number of cycle times required to fetch an instruction from a memory bank.

In a "branch" mode of operation, multiple prefetch elements, within the group of M prefetch elements 22–28, must begin to fetch an instruction in anticipation of placing a fetched instruction on instruction bus 38 during the cycle time immediately after the CPU determines which branch in the program will be executed. For example, if a three-way branch is forthcoming, three prefetch elements will receive three different prefetch tokens, each of which instructs a prefetch element to begin fetching an instruction from its associated memory bank. Once the CPU determines which one of the three branches to execute, one of the three prefetch elements will receive the activate token, and that prefetch element will place the next instruction on instruction bus 38, thereby enabling the CPU to continue executing instructions in the selected branch without waiting for instructions to be fetched from memory. The two prefetch units that were not activated are then made available to receive new prefetch instructions.

The number of prefetch elements required to implement the ROPE architecture depends upon the number of branches that may be selected during a conditional branch instruction and the number of cycle times required to fetch an instruction from a memory bank. If the data processing system CPU supports B-way conditional branching and the memory access requires C-cycles to fetch an instruction from a memory bank, then at least B*C prefetch elements are required to be able to prefetch instructions necessary to execute one B-way branch while maintaining an execution rate of one instruction per cycle time. For example, if the CPU supports three-way branching (B=3), and the memory requires four cycle times to fetch an instruction (C=4), then the number of prefetch elements required is at least 3*4, or 12.

Referring now to FIG. 2, there is depicted a prefetch schedule for performing a series of operations and branch instructions in a data processing system utilizing a plurality of prefetch elements as illustrated in the architecture of FIG. 1. In this figure, a sequence of nine cycle times, cycles A–I, are depicted vertically. During such cycle times, operations 50–72 and branch instructions 74 and 76 may be executed within CPU 44 (see FIG. 1), depending upon which branch is taken at branch instructions 74 and 76. In this example, operations 50–72 are able to complete execution within one cycle time.

Branch instruction 74 illustrates a multiway branch instruction, which, in this example, is a three-way branch instruction. Therefore, after cycle E, the program may execute operation 58, or operation 62, or operation 66, depending upon the outcome of tests performed at branch instruction 74. Multiway branches are made possible by CPUs which may execute a set of prespecified tests during a single cycle time. For example, branch instruction may determine whether the result of operation 56 is less than zero, equal to zero or greater than zero, and then branch accordingly. Thus, operation 58 may be executed if the result of operation 56 is less than zero, or operation 62 may be executed if the result of operation 56 is equal to zero, or operation 66 may be executed if the result of operation 56 is greater than zero.

During instruction fetches 80–98, prefetch elements 22–28 (see FIG. 1) provide address signals to associated memory banks 30–36, respectively, and receive instruction words during subsequent cycle times. If the speed of memory banks 30–36 is such that four cycle times are required to fetch an instruction, then an instruction prefetch operation, which is conducted by prefetch elements 22–28, must be initiated four cycle times before the instruction is to be placed on instruction bus 38. Therefore, as illustrated in FIG. 2, instruction fetches 80–98 are initiated four cycle times before they are placed on instruction bus 38. As illustrated in cycle B, three instruction fetches 82–86 are initiated in anticipation of branch instruction 74, which is a three-way branch instruction.

It may also be seen in FIG. 2 that several instruction fetches may be in various stages of completion during any given cycle time. For example, during cycle E, instruction fetch 80 is complete, instruction fetches 82–94 are in process, and instruction fetches 96 and 98 have just been initiated. Thus, during cycle E, ten instruction fetches, which are conducted utilizing ten prefetch elements, are in various stages of operation. Those persons skilled in the art will recognize that additional instruction prefetches, which are not illustrated, may be performed during cycle E for operations which follow operations 60, 64, 70, and 72. Additionally, instruction fetches for operations 50–56 are not shown in FIG. 2.

Thus, a person of ordinary skill in the art should appreciate that in order to sustain consecutive B-way branch instructions at a rate of one B-way branch per cycle time in a data processing system utilizing instruction memory that requires C-cycles to fetch an instruction, the number of prefetch elements required approaches $B^{c+1}$ prefetch elements. Even for a data processing system that permits three-way branch instructions and utilizes memory that requires four cycles to fetch an instruction, approximately 240 prefetch elements would be required.

Therefore, the problem remaining in the prior art is to provide a data processing system having performance capabilities substantially similar to a data processing system utilizing ROPE architecture, while requiring substantially fewer prefetch elements.

SUMMARY OF THE INVENTION

It is one objective of the present invention to provide an improved data processing system.

It is another objective of the present invention to provide a method and system for efficiently executing instructions in a data processing system having multiple instruction prefetch elements.

It is yet another objective of the present invention to provide a prefetch element capable of providing a CPU with a plurality of instructions at the rate of one instruction per cycle time.

It is yet another objective of the present invention to provide a data processing system architecture having multiple prefetch elements that is less expensive to manufacture, comprises fewer components, and provides substantially similar performance to prior art architectures having multiple prefetch elements.

The foregoing objects are achieved as is now described. In a data processing system, a plurality of prefetch elements are provided for prefetching instructions from a group of memory arrays coupled to each prefetch element. A plurality of instruction words are sequentially stored in each group of memory arrays coupled to each prefetch element. In response to a selected prefetch element receiving a prefetch token, the selected prefetch element sequentially recalls instruction words from the group of memory arrays coupled to the selected prefetch element. Thereafter, the selected prefetch element transfers the sequence of instruction words to a central processing unit at a rate of one instruction Word per cycle time. In response to a forthcoming conditional branch instruction, a plurality of prefetch elements may initiate instruction fetching so that the proper instruction may be executed during the cycle time immediately following the conditional branch instruction. By coupling a group of memory banks to each prefetch element, and limiting the location of branch instructions to the last memory bank in the group of memory banks, the number of prefetch elements required to implement a data processing system having substantially similar performance to the prior art architecture is reduced. In an alternative embodiment, video memories are utilized to store instruction words, and provide such instruction words to the CPU at the rate of one instruction word per cycle time.

The above, as well as additional objects, features, and advantages of the present invention, will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 2:
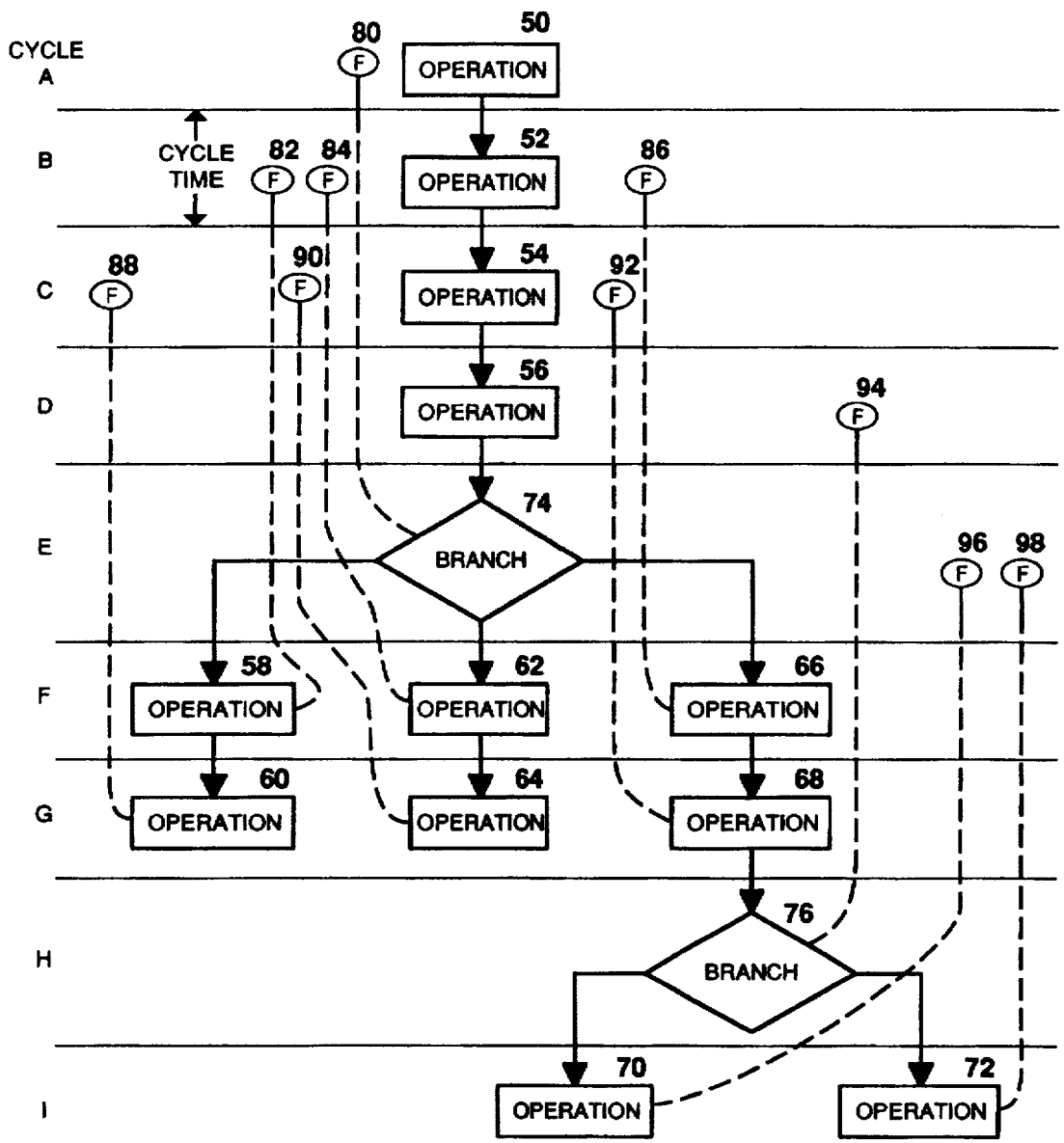
FIG. 2 depicts a prefetch schedule for performing a series of operations and branch instructions utilizing a plurality of prefetch elements as illustrated in the architecture of FIG. 1.
Figure 3:
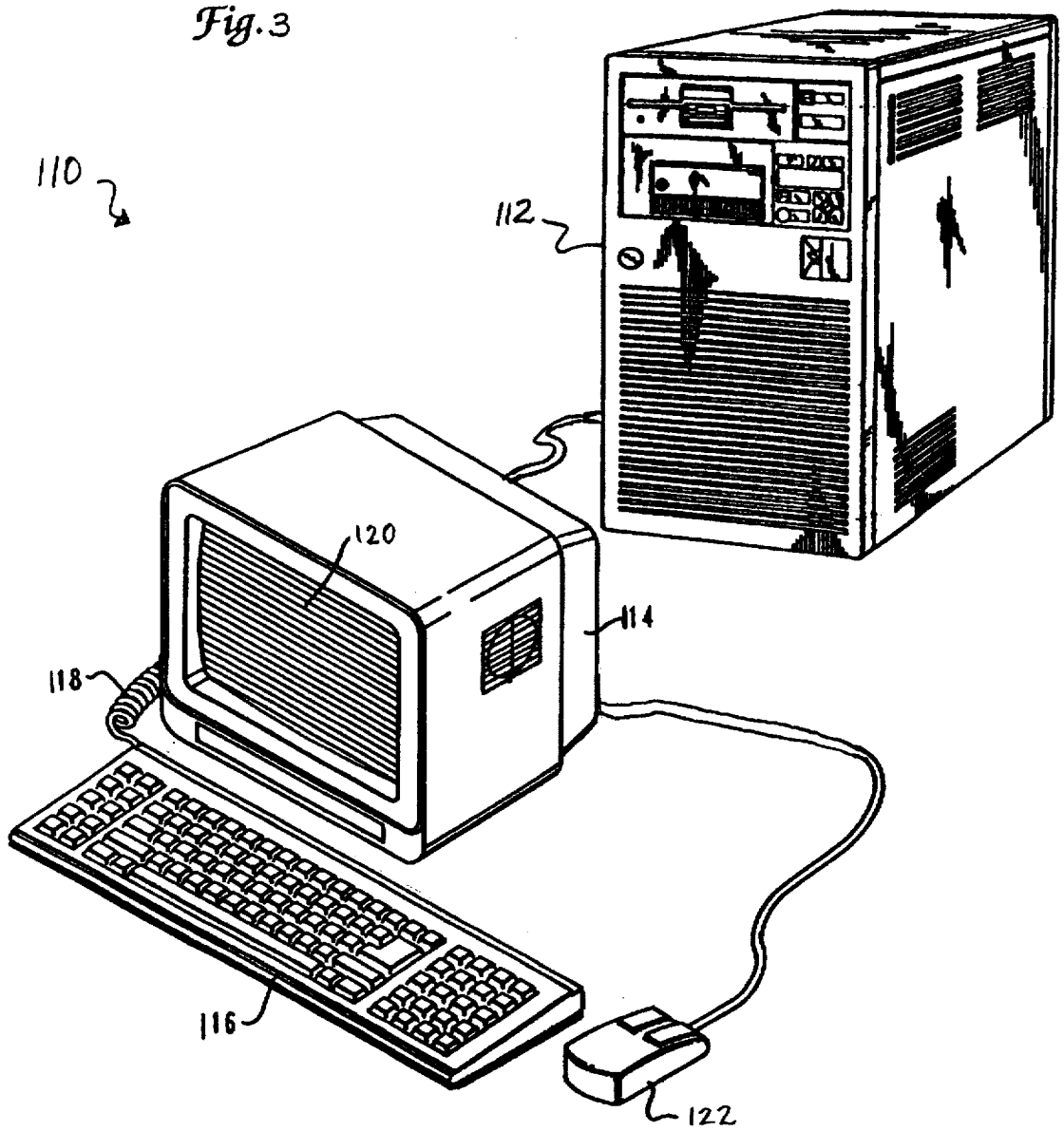
FIG. 3 depicts a data processing system which may be utilized to implement a preferred embodiment of the present invention.

With reference now to the figures and in particular with reference to FIG. 3, there is depicted a data processing system 110 which includes processor 112, keyboard 116, and display 114. Keyboard 116 is coupled to processor 112 via cable 118. Display 114 includes display screen 120, which may be implemented utilizing a cathoray tube (CRT), a liquid crystal display (LCD), an electroluminescent panel, or the like. Data processing system 110 also includes pointing device 122 which may be implemented utilizing a track ball, joystick, touch sensitive tablet or screen, or as illustrated in FIG. 2, a mouse. Pointing device 122 may be utilized to move a pointer or cursor on display screen 120. Those persons skilled in the art of data processing system design will recognize that display 114, keyboard 116, and pointing device 122 may each be implemented utilizing any one of several known off-the-shelf components.

Figure 4:
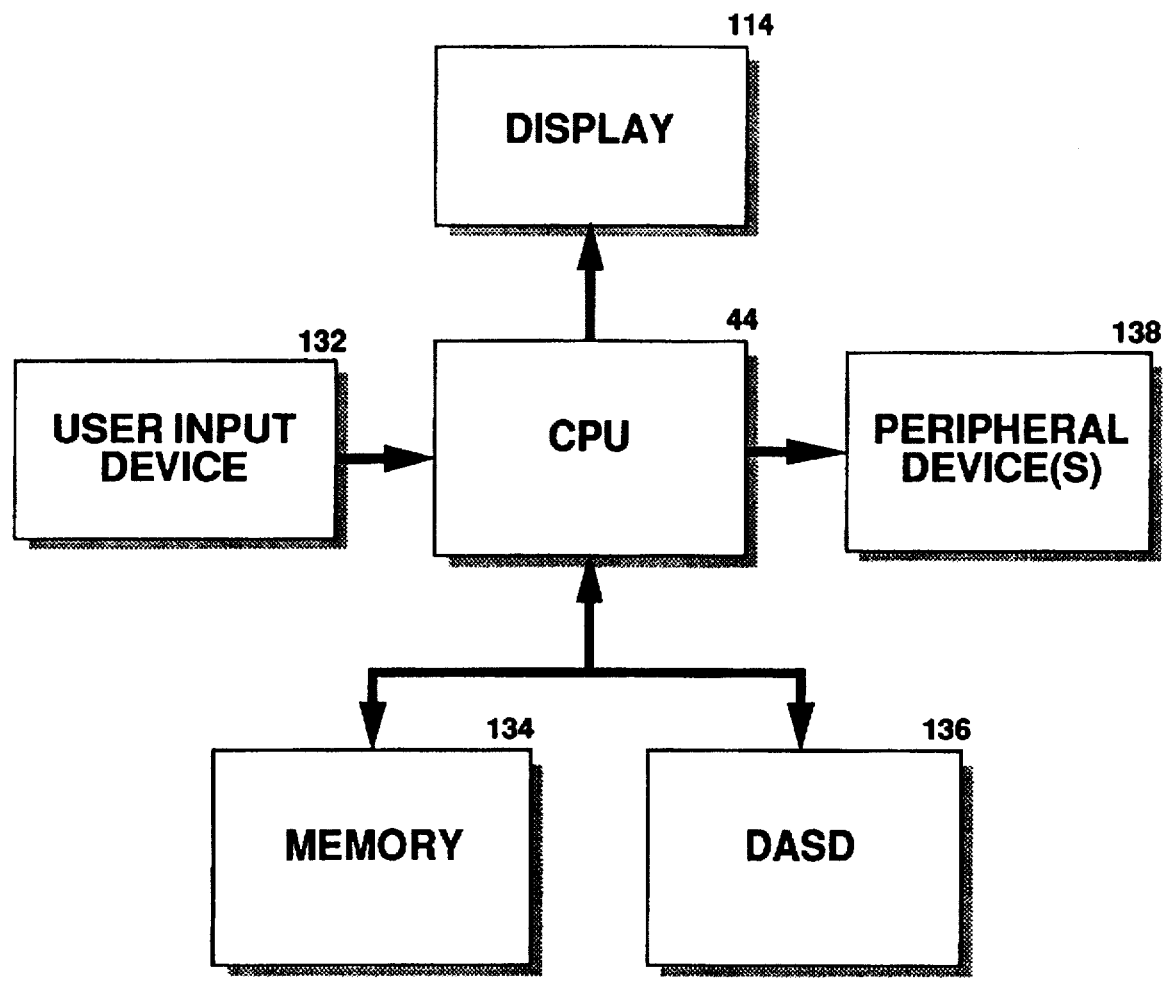
FIG. 4 is a more detailed high-level block diagram further illustrating the major components of the data processing system of FIG. 3.

FIG. 4 depicts a more detailed high-level block diagram further illustrating the major components of data processing system 110 of FIG. 3. Data processing system 110 is controlled primarily by instructions, in the form of software, executed within central processing unit (CPU) 44. CPU 44 is coupled to display 114, which is utilized to display text and graphics, and possibly animated graphics or video. CPU 44 is also coupled to user input device 132, which is utilized to receive input from a data processing system user. User input device 132 may include keyboard 116 and pointing device 122, as illustrated in FIG. 3. Memory 134 and direct access storage device (DASD) 136 may be utilized for storing application programs (i.e., software) and data sets.

According to an important aspect of the present invention, memory 134 is divided into memory banks for storing instructions, and separate data memory banks for storing program variables or other temporary or variable data. The organization of memory 134, and the method and system for coupling memory 134 to CPU 44, will be described below in greater detail with reference to FIGS. 5 and 6.

Peripheral devices 138 may also be included in data processing system 110. Such peripheral devices may include communications devices (i.e., modems or network adapters), or an audio output device for use during a multimedia presentation.

Figure 5:
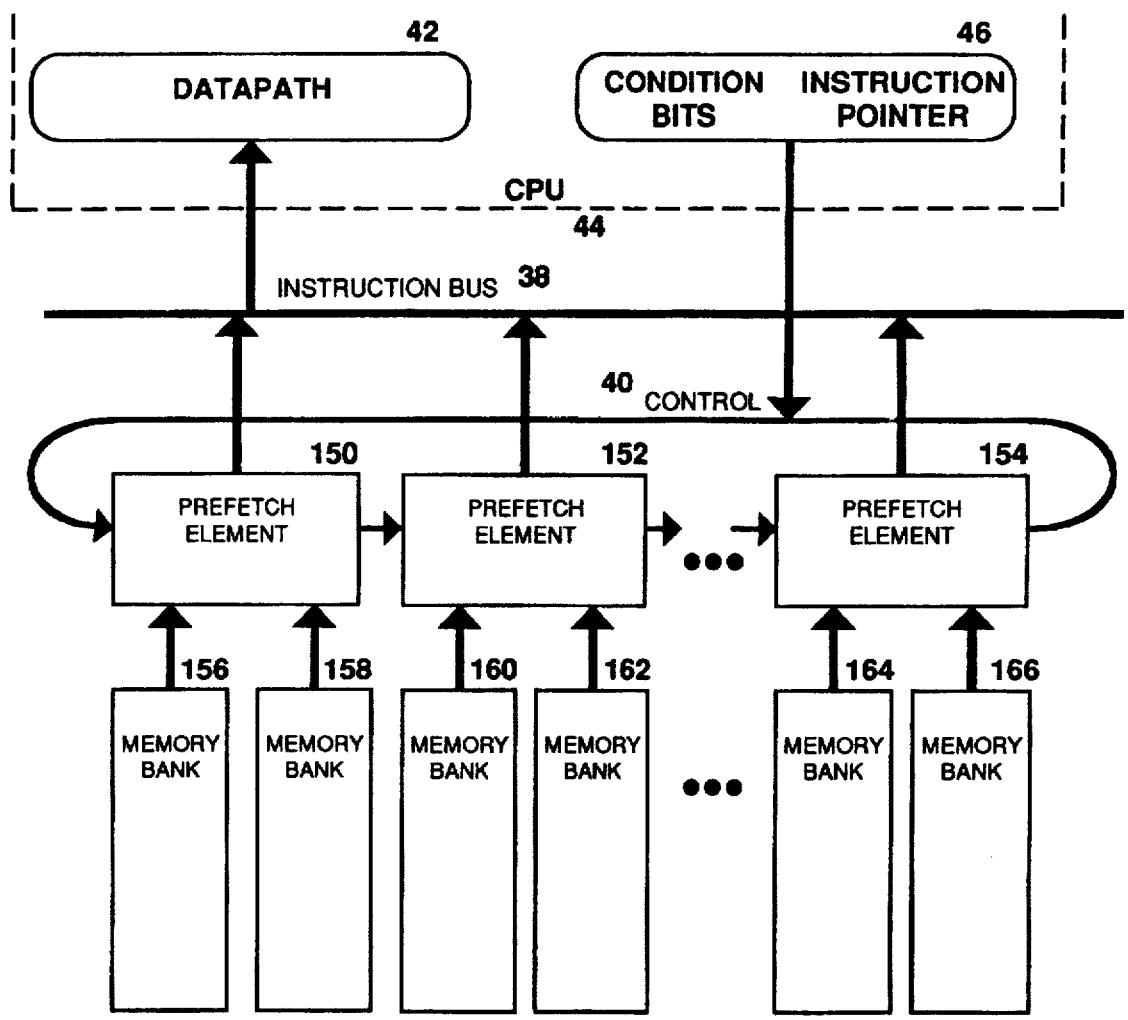
FIG. 5 depicts a high-level schematic diagram of a system for efficiently executing instructions in a central processing unit of a data processing system in accordance with the method and system of the present invention.

With reference now to FIG. 5, there is depicted a high-level schematic diagram of a system for efficiently executing instructions in a central processing unit of a data processing system. As illustrated, data path 42 within CPU 44 is coupled to, and receives instructions from, instruction bus 38. Control information 46, which may be generated within CPU 44, is coupled to control bus 40. Control information 46 may include condition bits, which are set or cleared as a result of operations or tests performed in the registers of CPU 44, and instruction pointer data, which may indicate the memory address of the next instruction to be received by data path 42 within CPU 44.

Also coupled to instruction bus 38 and control bus 40 are M prefetch elements 150–154. Prefetch elements 150–154 are utilized to place instructions on instruction bus 38 in response to receiving an activate token via control bus 40. Such an activate token is either passed from one prefetch element to a next prefetch element during a non-branch mode of instruction execution, or, in a branch mode of instruction execution, is generated within a prefetch element that was previously designated a possible target of a branch instruction. After that designated prefetch element determines that it is the target of the branch instruction, and that the next software instructions following the branch are stored in memory banks associated with that prefetch element, an activate token is generated within that prefetch element.

According to an important feature of the present invention, a plurality of memory banks are coupled to each prefetch element 150–154. In this example, memory banks 156 and 158 are coupled to prefetch element 150, memory banks 160 and 162 are coupled to prefetch element 152, and memory banks 164 and 166 are coupled to prefetch element 154. Although in this example only two memory banks are coupled to each prefetch element, in other embodiments of the present invention more than two memory banks may be coupled to any one prefetch element.

By associating two or more memory banks with each prefetch element, a single prefetch element may provide two or more sequential instructions to data path 42. In order to obtain the full benefit of associating more than one memory bank with each prefetch element, the location of branch instructions, which may be stored in the memory banks associated with a prefetch element, should be restricted to the last memory bank associated with a particular prefetch element. Thus, in the example illustrated in FIG. 5, the location of branch instructions may be restricted to memory bank 158, 162, and 166. This restriction placed on the location of branch instructions prevents the execution of a sequence of consecutive branch instructions, and reduces the maximum rate of branching to one branch every other cycle time. For example, after branching to prefetch element 150, one non-branch instruction stored in memory bank 156 must be executed before executing another instruction, which may be a branch instruction, stored in memory bank 158. If the execution of a non-branch instruction is not needed between two branch instructions, then the compiler may insert a "no-op," or no-operation instruction.

By restricting branch instruction execution to every nth cycle time, the number of prefetch elements required may be significantly reduced. For example, in a data processing system which permits three-way branching and requires four cycle times before providing an instruction to instruction bus 38, 12 prefetch elements are required. If a branch operation is limited to one branch in every two cycle times, the number of prefetch elements required may be reduced to six. This reduction in the number of prefetch elements required is a result of prefetch elements becoming available to prefetch instructions during the non-branch operation executed between two branch instructions. Additional prefetch elements may also become available as a result of prefetch operations which may be abandoned because selected prefetch elements were fetching instructions a branch in the program that was not selected by a previous branch instruction. If a program should require two consecutive branch operations, a "no-op", or no-operation instruction may be inserted between the two branch instructions.

In some cases, a data processing system having a reduced number of prefetch elements may be able to sustain two or three consecutive branch operations, while not being able to sustain a continuous sequence of branch operations. The hardware savings produced by reducing the number of prefetch elements is directly proportional to the number of memory banks associated with each prefetch element, and the number of non-branch instructions executed between two branch instructions which limits the frequency of branch operations. If memory banks 156–166 are relatively slow devices, the maximum number of instructions provided by a prefetch element 150–154 is limited to the number of memory banks associated with each prefetch element. Thus, in the example of FIG. 5, prefetch elements 150–154 may provide a maximum of two sequential instructions to instruction bus 38 before another prefetch element becomes active.

Figure 6:
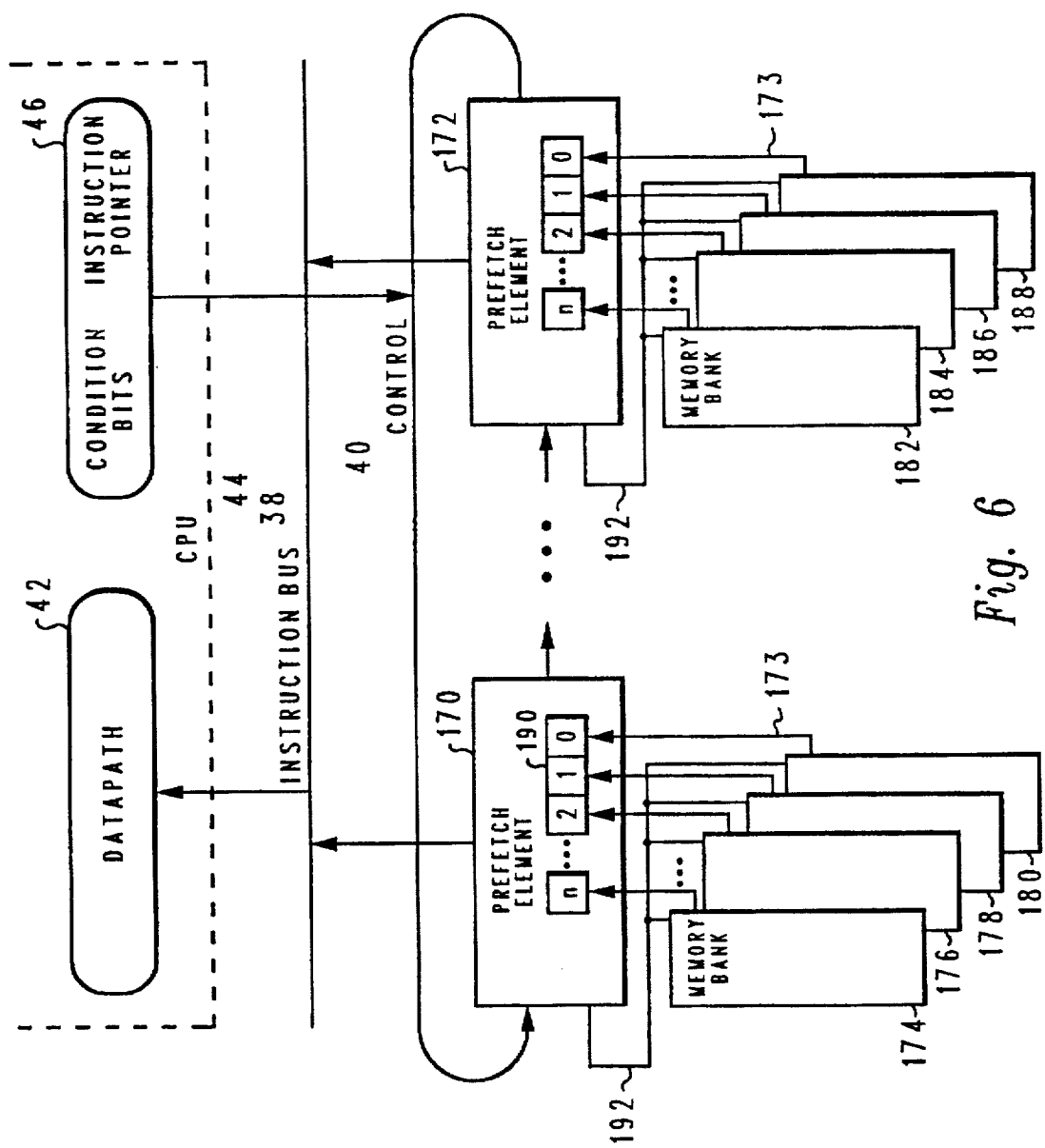
FIG. 6 illustrates a high-level schematic diagram of a method and system for fetching instructions from a memory bank comprised of "video memories" in accordance with the method and system of the present invention.

With reference now to FIG. 6, there is depicted a high-level schematic diagram of a method and system for fetching instructions from a memory bank comprised of video memories, or video DRAMs. In this alternative embodiment, M prefetch elements 170–172 are coupled to instruction bus 38 and control bus 40 for providing instructions to data path 42 within CPU 44. Each prefetch element 170–172 receives instructions from a plurality of memory banks, each of which outputs a single bit of an n-bit instruction word. As illustrated, prefetch element 170 is coupled to the serial output 173 of n-memory banks 174–180, and prefetch element 172 is coupled to the serial output 173 of n-memory banks 182–188.

Memory banks 174–180 and 182–188 may be implemented utilizing any one of several known multi-port dynamic random access memories (DRAMs), also called video DRAMs, which include a random access memory array coupled to an on-chip shift register having a high-speed serial output port. Each video DRAM has one port for random access and another port for providing fast serial output from the on-chip shift register. The random access port conforms to the signal and timing requirements of a standard DRAM, and the on-chip shift register supports high speed serial output. Additionally, the clock rate of the random access portion may be much slower, and independent from, the clock rate of the serial output portion.

In order to recall an instruction, each prefetch element provides the same address to the n-memory banks associated with that prefetch element. Thereafter, a single bit, output from the serial output port 173 of each of the n-memory banks, is received by the prefetch element to form a single n-bit instruction word. For example, prefetch element 170 provides address signals to memory banks 174–180. Thereafter, the serial output 173 of the shift registers within memory banks 174–180 each provide a single bit which comprises an n-bit instruction word. Moreover, since the address provided by prefetch element 170 may load an entire word comprising several bits of information into the shift registers of memory banks 174–180, several n-bit instructions may be sequentially loaded into register 190 within prefetch element 170 and transferred to instruction bus 38 at the rate of one instruction per cycle time. This is a result of the fact that instructions may be shifted out of memory banks 174–180 in response to common clock 192 at several times the speed at which memory words are addressed and loaded into the shift register within memory banks 174–180.

For example, if the shift register within memory banks 174–180 are 256 bits wide, then 256 consecutive instructions may be shifted out of the memory banks and loaded into register 190 and placed on instruction bus 38 at the rate of one instruction per cycle time. The fact that several instructions may be shifted out of memory banks 174–180 at the rate of one instruction per cycle time allows other prefetch elements to prepare for a forthcoming multiway branch, thus reducing the number of prefetch elements required. For example, assume that C-cycles are required to fetch an instruction from memory. After C+1 cycles have been provided to instruction bus 38 by a particular prefetch element, all other prefetch elements within the data processing system may be idle and available to begin prefetching instructions. If the data processing system supports B-way conditional branching, a data processing system having B+1 prefetch elements may support a B-way conditional branch every C-cycles without causing CPU 44 to wait for an instruction following a B-way branch.

Figure 7:
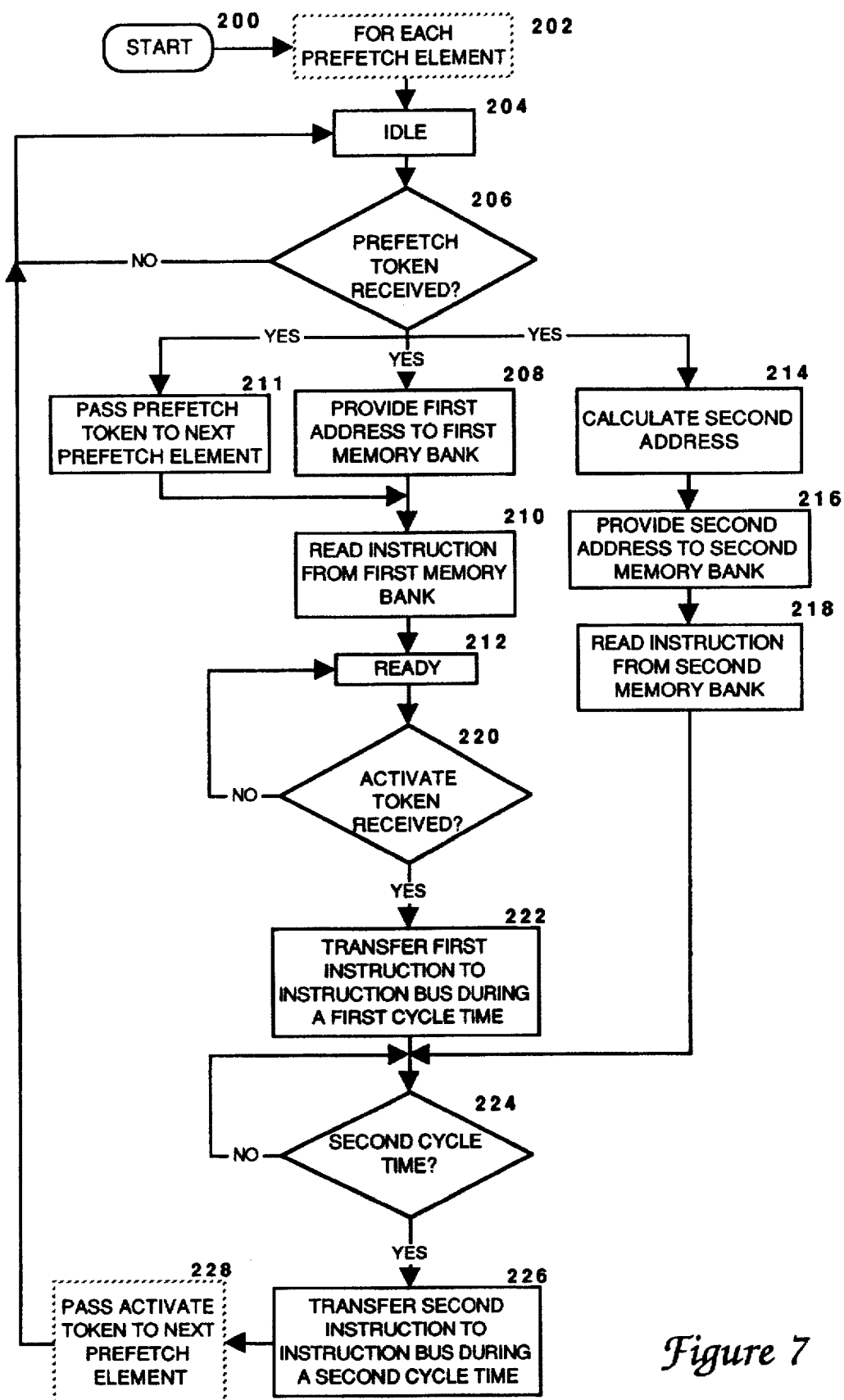
FIG. 7 is a high-level logic flowchart which illustrates the process utilized by a prefetch element to fetch instructions from a plurality of associated memory banks in accordance with the method and system of the present invention.

With reference now to FIG. 7, there is depicted a high-level logic flowchart which illustrates the process utilized by a prefetch element to fetch instructions from a plurality of associated memory banks in accordance with the method and system of the present invention. The process begins at block 200. Block 202 illustrates the fact that this process is conducted within each prefetch element. Initially, the prefetch element enters into an idle state, as depicted at block 204. The prefetch unit remains idle until a prefetch token has been received, as illustrated at block 206 and the "no" branch from block 206 to block 204. A prefetch element may receive a prefetch token under one of two different circumstances. In a first circumstance, a prefetch token may be received from a preceding prefetch element in the ring of prefetch elements. Receiving a prefetch token from a preceding prefetch element is typical in a non-branching mode of operation.

In a second circumstance, where a branch instruction is forthcoming, a prefetch command is issued via control bus 40 (see FIG. 5). Such prefetch commands are issued to all possible targets of the forthcoming branch operation. Thus, if a three-way branch is forthcoming, three prefetch commands are issued to three different prefetch elements. By issuing prefetch commands to all possible targets of a multiway branch, data path 42 (see FIG. 5) may receive the appropriate instruction following the branch instruction within the cycle time immediately after the branch instruction.

Once a prefetch token has been received, the prefetch element provides a first address to the first associated memory bank, as depicted at block 208. Thereafter, the prefetch element reads an instruction from the first memory bank, as illustrated at block 210. Those persons skilled in the art will recognize that several cycle times may elapse between the time an address is provided (see block 208) and the time an instruction is read from the memory bank (see block 210).

As the prefetch element provides a first address to the first associated memory bank, the prefetch element also passes an appropriate prefetch token, containing an appropriate prefetch address, to the next prefetch element in the ring of prefetch elements during the next cycle time, as illustrated at block 211. If the last prefetch element is passing the prefetch token to the first prefetch element in the ring of prefetch elements, the prefetch address information contained in the prefetch token may be incremented. If a branch instruction is forthcoming, additional prefetch tokens may be created as the prefetch token is passed.

Once the prefetch element has read the instruction from the first memory bank, the prefetch element is ready to place that instruction on instruction bus 38, as depicted at block 212.

Referring again to block 206, once a prefetch token has been received, the prefetch element may begin to calculate the address of the second instruction stored in the second memory bank, if the address of the second instruction is different from the address of the first instruction, as illustrated at block 214. Thereafter, the prefetch element provides the second address to the second memory bank, as depicted at block 216. After what may be several cycle times later, the prefetch element reads an instruction from the second memory bank, as illustrated at block 218.

As illustrated at block 220, after the prefetch element is ready, the prefetch element determines whether or not an activate token has been received. If an activate token has not been received, the process iteratively passes to block 220 until such time as an activate token has been received.

If the prefetch element has received an activate token, the prefetch element transfers the first instruction to the instruction bus during a first cycle time, as illustrated at block 222. Thereafter, the process determines whether or not a second cycle time has begun, as depicted at block 224. If a second cycle time has not begun, the process iterates until such time as a second cycle time has begun, as illustrated by the "no" branch from block 224.

If a second cycle time has begun, the prefetch element transfers a second instruction to the instruction bus during a second cycle time, as illustrated at block 226. Such a second instruction is read from the second memory bank prior to the second cycle time, as illustrated in block 218.

After the second instruction has been transferred to the instruction bus during a second cycle time, the process may pass an activate token to the next prefetch element during the next cycle time, as depicted at block 228. If the next cycle time follows a branch instruction, the active prefetch element will be determined by the group of prefetch elements previously designated as possible targets of the branch, from information present on control bus 40.

Finally, the process passes to block 204, wherein the prefetch element returns to an idle state, and becomes available to receive another prefetch token.

Figure 8:
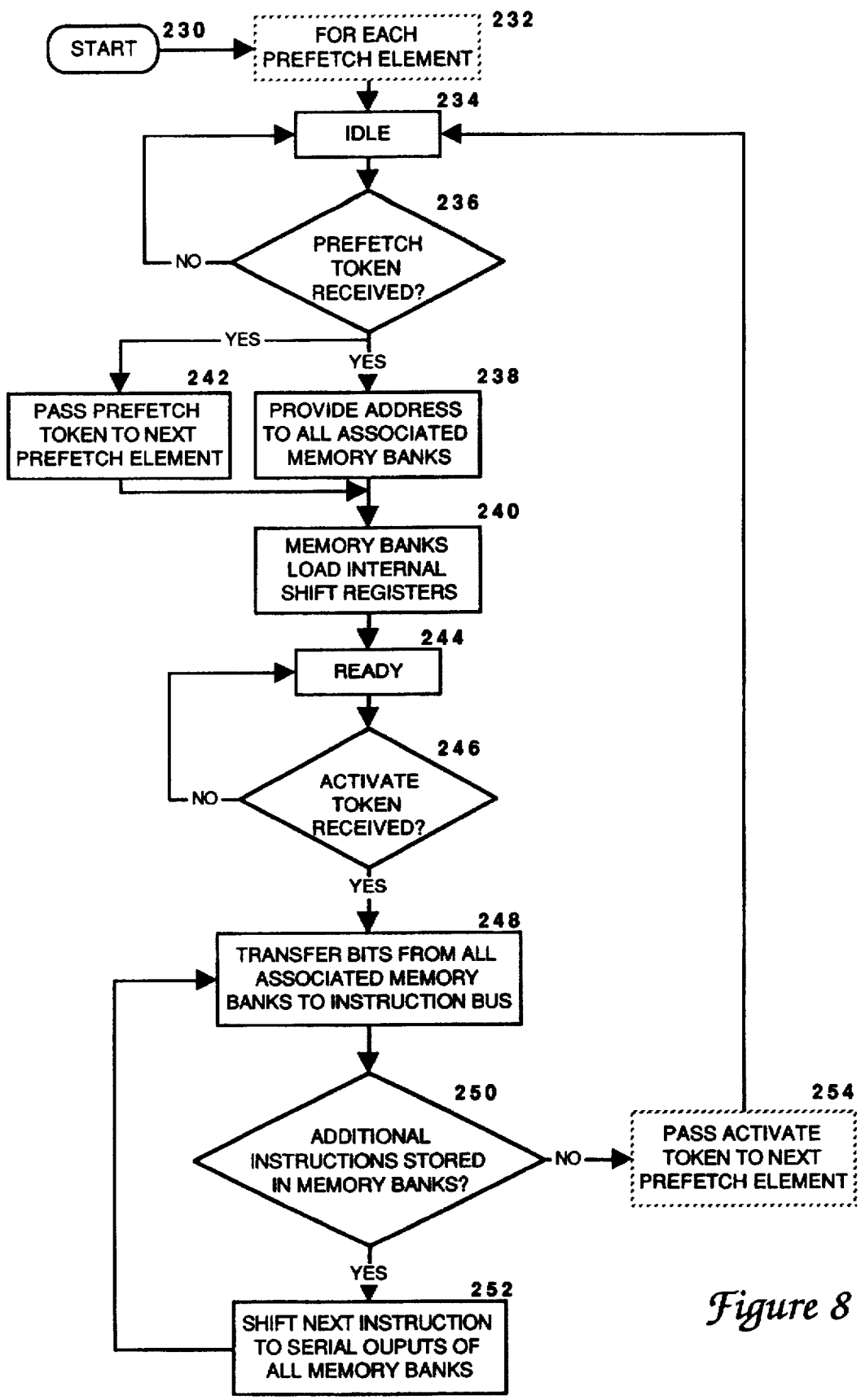
FIG. 8 is a high-level logic flowchart which illustrates the process utilized by each prefetch element to fetch a sequence of instructions from a plurality of memory banks having serial outputs in accordance with the method and system of the present invention.

Referring now to FIG. 8, there is depicted a high-level logic flowchart which illustrates the process utilized by each prefetch element to fetch a sequence of instructions from a plurality of memory banks having serial outputs in accordance with the method and system of the present invention. The process begins at block 230, and is conducted within each prefetch element, as illustrated at block 232. Initially, the prefetch element is placed in an idle state, as depicted at block 234. As illustrated at block 236, the prefetch element determines whether or not a prefetch token has been received. If a prefetch token has not been received, the prefetch element remains in the idle state, as depicted by the "no" branch from block 236.

If the prefetch element has received a prefetch token, the prefetch element provides an address to all memory banks associated with the prefetch element, as depicted at block 238. As mentioned above, a prefetched token may be received from a prior prefetch element in the ring of prefetch elements, or as a result of a prefetch command issued to all possible targets of a forthcoming branch operation. Once the prefetch element provides an address to all associated memory banks, the memory banks load their respective internal shift registers with the instruction word stored at the location addressed, as illustrated at block 240. Those persons skilled in the art should recognize that several cycle times may be required between the time the associated memory banks receive an address (see block 238) and the time the internal shift registers have been loaded with the addressed instruction word (see block 240).

As the prefetch element provides the address to all associated memory banks, the prefetch element also passes an appropriate prefetch token, containing an appropriate prefetch address, to the next prefetch element in the ring of prefetch elements during the next cycle time, as illustrated at block 242. If the last prefetch element is passing the prefetch token to the first prefetch element in the ring of prefetch elements, the prefetch address information contained in the prefetch token may be incremented. If a branch instruction is forthcoming, additional prefetch tokens may be created as the prefetch token is passed.

After the memory banks have loaded the internal shift registers, the prefetch element enters a ready state, as depicted at block 244. After the prefetch element is ready, the prefetch element determines whether or not an activate token has been received, as illustrated at block 246. If an activate token has not been received, the prefetch element remains in the ready state, as indicated by the "no" branch from block 246.

If an activate token has been received, the prefetch element transfers bits read from all associated memory banks to the instruction bus, as depicted at block 248. During such a transfer, one bit from each associated memory bank is utilized to form an n-bit instruction word, as described with reference to FIG. 6. Once the prefetch element has transferred such an instruction word to the instruction bus, the prefetch element determines whether or not additional instructions to be placed on the instruction bus are stored in the memory banks.

If additional instruction words are stored in the memory banks and are scheduled for execution, the prefetch element provides a shift clock to shift the next instruction word to the serial outputs of all associated memory banks, as depicted at block 252. Thereafter, the next instruction word is transferred to the instruction bus during the next consecutive cycle time.

Since the serial output clock may be capable of shifting data bits to the serial output at a clock rate of one clock per cycle time, the prefetch element is able to provide a sequence of instructions to instruction bus 38 (see FIG. 6). This sequence of instructions may comprise a number of instruction words equal to the number of bits loaded into the internal shift registers of the associated memory banks. Thus, the sequence of instruction words may be 256 instructions in length if a typical video DRAM is utilized to implement memory banks 174–180 (see FIG. 6).

If there a

If there are no additional instructions scheduled for execution stored in the associated memory banks, the prefetch element may pass an activate token to the next prefetch element during the next cycle time, as depicted at block 254. If the next cycle time follows a branch instruction, the active prefetch element will be determined by the group of prefetch elements previously designated as possible targets of the branch, from information present on control bus 40. Finally, the prefetch element returns to the idle state, as illustrated at block 234.

If the internal shift register of memory banks 174–180 contain a large number of bits (i.e., 256 or 512 bits), it may be advantageous to utilize a video DRAM design having an address input tap capable of tapping the shift register at different locations. For example, if a video DRAM has a 256 bit shift register, the tap feature may permit bit output to begin with bit 16, or bit 32 for example. Since instruction sequences are typically three to five instructions in length, such a tap feature permits more efficient utilization of the video DRAM storage capacity.

Another memory technology available for implementing memory banks 174–180 is the "nibble-mode" DRAM memories. While such nibble-mode DRAMs require a considerable time to respond to a memory fetch, such memories are capable of fetching words stored in several consecutive locations at a rate which may be one word per cycle time. If nibble-mode DRAMs are utilized to implement memory banks associated with a prefetch element, consecutive instruction words may be stored in consecutive memory locations. Thus, when a prefetch element becomes active, a sequence of instruction words may be provided to data path 42 at the rate of one instruction word per cycle time. After the sequence of instruction words has been transferred to instruction bus 38, the activate token may pass to the next prefetch element, where an additional sequence of instructions may be provided.

Figure 1:
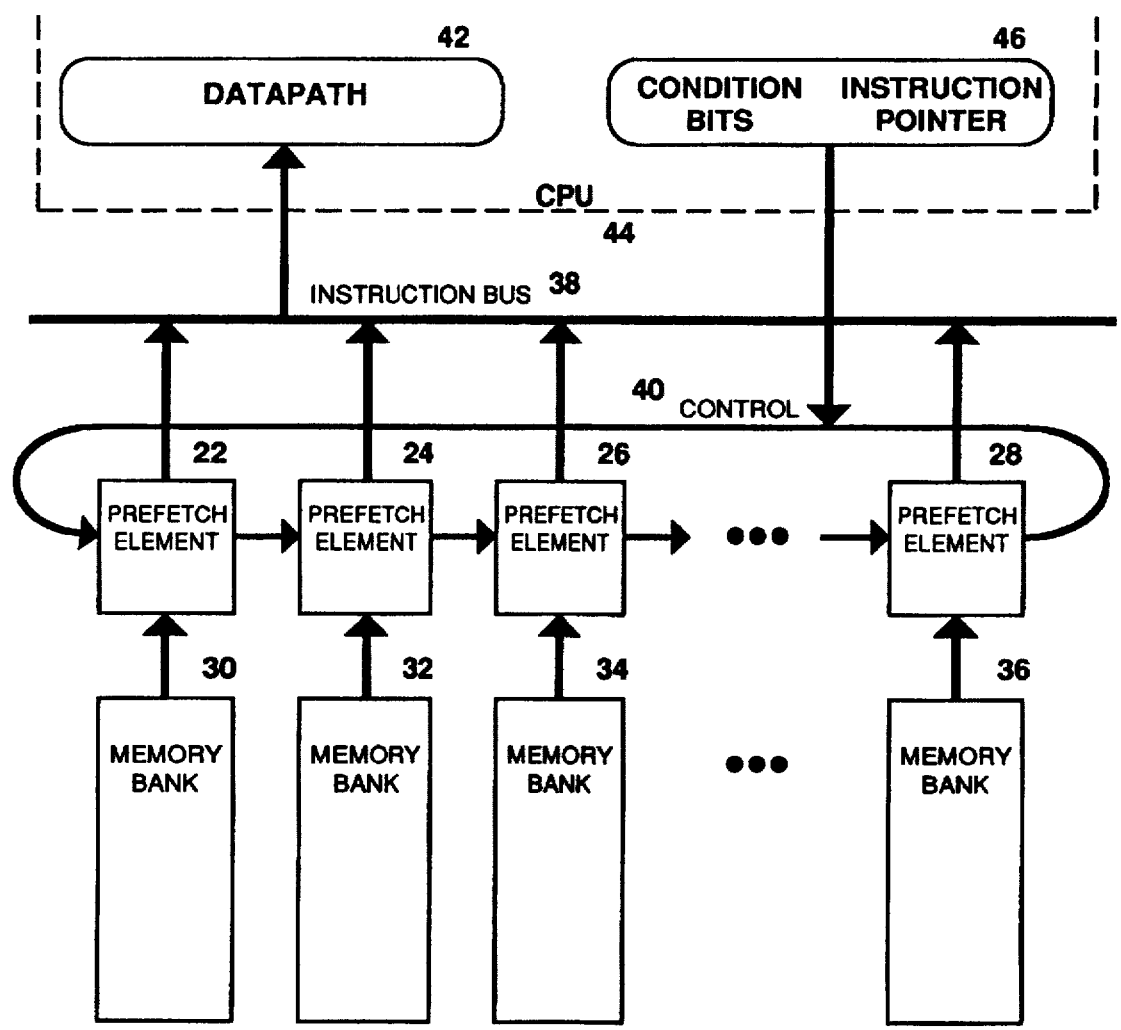
FIG. 1 depicts a ring of prefetch elements (ROPE) architecture, which is known in the prior art.

If nibble-mode DRAMs are utilized, the data processing system memory architecture would be similar to the architecture illustrated in FIG. 1, wherein a single memory bank is associated with each prefetch element. Even though the architecture may be similar to that illustrated in FIG. 1, the nibble-mode DRAMs provide the additional capability of fetching a plurality of instructions at a rate of one instruction per cycle time; the prior art shown in FIG. 1 does not have this capability.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

I claim:

1. A system for efficiently executing instructions in a central processing unit of a data processing system comprising:

a central processing unit for executing instructions;

a plurality of memory banks for storing said instructions, wherein each of said memory banks includes one or more memory devices coupled together to recall at least a portion of one of said instructions in response to receiving an address signal;

an instruction bus coupled to said central processing unit for transferring said instructions to said central processing unit;

a control bus coupled to said central processing unit for transferring control data;

a plurality of prefetch elements, wherein each of said plurality of prefetch elements is coupled to a subgroup of two or more of said plurality of memory banks, to said instruction bus, and to said control bus said subgroup of said plurality of memory banks including said plurality memory banks in particular sequence, said instructions including a first plurality of instructions, each of said instructions included within said first plurality of instructions being stored only in a last of said plurality of memory banks in said particular sequence;

wherein said plurality of prefetch elements are each operable in a plurlaity of modes including;

(a) an idle mode wherein said prefetch element waits for said control data before retching a plurality of instructions in program order from said subgroup of said plurality of memory banks;

(b) a fetching mode wherein said prefetch element fetches said plurality of instructions in program order from said subgroup of said plurality of memory banks in response to receiving said control data, wherein fetching of one of said plurality of instructions overlaps a portion of said fetching of another of said plurality of instructions;

(c) a ready mode wherein said prefetch element has fetched said plurality of instructions from said subgroup of said plurality of memory banks and is waiting to receive said control data via said control bus before transferring said plurality of instructions in program order to said central processing unit via said instruction bus; and (d) an active mode wherein said prefetch element transfers said plurality of instructions in program order to said central processing unit via said instruction bus in response to receiving said control data via said control bus.

2. The system for efficiently executing instructions in a central processing unit of a data processing system according to claim 1 wherein, said plurality of memory banks for storing said instructions comprises a plurality of memory banks having a serial output, and wherein said plurality of prefetch elements are each coupled to said serial output of each of a subgroup of N of said plurality of memory banks, and wherein each of said plurality of memory banks is coupled to only one of said plurality of prefetch elements.

3. The system for efficiently executing instructions in a central processing unit of a data processing system according to claim 2 wherein, said central processing unit may execute one instruction per cycle time, and wherein a complete N-bit instruction word is comprised of bits output from said serial output of each of said subgroup of N of said plurality of memory banks, and wherein said subgroup of N of said plurality of memory banks are coupled to a common clock for clocking an output of a series of N-bit instruction words at a rate of at least one instruction per cycle time.

4. The system for efficiently executing instructions in a central processing unit of a data processing system according to claim 3 wherein, said plurality of prefetch elements provide address signals and said common clock signal to said subgroup of N of said plurality of memory banks, and wherein the timing of said common clock signal is independent of the timing of said address signals.

5. The system for efficiently executing instructions in a central processing unit of a data processing system according to claim 1 wherein, said plurality of prefetch elements are each coupled to a subgroup of N memory banks where N is greater than one, and wherein each of said plurality of memory banks is coupled to only one of said plurality of prefetch elements.

6. The system for efficiently executing instructions in a central processing unit of a data processing system according to claim 1 wherein, said control data received by said plurality of prefetch elements via said control bus is an activate token.

7. The system according to claim 1 wherein said first plurality of instructions are branch instructions.

8. A system for efficiently executing instructions in a central processing unit of a data processing system comprising:

a central processing unit for executing instructions;

a plurality of memory banks for storing said instructions, wherein each of said memory banks includes one or more memory devices coupled together to recall at least a portion of one of said instructions in response to receiving an address signal;

an instruction bus coupled to said central processing unit for transferring said instructions to said central processing unit;

a control bus coupled to said central processing unit for transferring control data;

a plurality of prefetch elements, each of said plurlaity of prefetch elements coupled to a subgroup of said plurality of memory banks, to said instruction bus, and to said control bus, each of said plurality of prefetch elements for fetching said instructions in program order from said subgroup of two or more of said plurality of memory banks and transferring two or more of said instructions to said instruction bus in program order in response to receiving said control data via said control bus, wherein said fetching of one of said instructions overlaps a portion of said fetching of another of said instructions; and said subgroup of said plurality of memory banks including said plurality of memory banks in particular sequence, said instructions including a first plurality of instructions, each of said instructions included within said first plurality of instructions being stored only in a last of said plurality of memory banks in said particular sequence.

9. The system for efficiently executing instructions in a central processing unit of a data processing system according to claim 8 wherein, said plurality of memory banks for storing said instructions comprises a plurality of memory banks having a serial output, and wherein said plurality of prefetch elements are each coupled to said serial output of each of a subgroup of N of said plurality of memory banks, and wherein each of said plurality of memory banks is coupled to only one of said plurality of prefetch elements.

10. The system for efficiently executing instructions in a central processing unit of a data processing system according to claim 9 wherein, said central processing unit may execute one instruction per cycle time, and wherein a complete N-bit instruction word is comprised of bits output from said serial output of each of said subgroup of N of said plurality of memory banks, and wherein said subgroup of N of said plurality of memory banks are coupled to a common clock for clocking an output of a series of N-bit instruction words at a rate of at least one instruction per cycle time.

11. The system for efficiently executing instructions in a central processing unit of a data processing system according to claim 10 wherein, said plurality of prefetch elements provide address signals and said common clock signal to said subgroup of N of said plurality of memory banks, and wherein the timing of said common clock signal is independent of the timing of said address signals.

12. The system for efficiently executing instructions in a central processing unit of a data processing system according to claim 9 wherein, said control data received by said plurality of prefetch elements via said control bus is an activate token.

13. The system for efficiently executing instructions in a central processing unit of a data processing system according to claim 8 wherein, said plurality of prefetch elements are each coupled to a subgroup of N memory banks where N is greater than one, and wherein each of said plurality of memory banks is coupled to only one of said plurality of prefetch elements.

14. The system according to claim 8 wherein said first plurality of instructions are branch instructions.

15. A method for efficiently executing instructions in a central processing unit of a data processing system, wherein said central processing unit has a cycle time equal to the time between instruction word fetches, said method comprising the steps of:

providing M prefetch elements coupled to said central processing unit for prefetching instructions;

coupling a group of N memory banks to each one of said M prefetch elements, where N is greater than one, and wherein each of said M prefetch elements with said group of N coupled memory banks includes means for outputting instruction words at a rate of one per said cycle time, and further wherein said group of N memory banks include memory banks in e particular sequence;

determining if a next instruction word to be stored is included within a first plurality of instructions;

in response to a determination that said next instruction word is not included within said first plurality of instructions, storing said next instruction word in a next memory bank, said next available memory bank being the next memory bank within said particular sequence such that no other instruction word is programmed for execution by said central processing unit between program-order execution of said sequentially stored instruction words in said plurality of instruction words;

in response to a determination that said next instruction word is included within said first plurality of instruction, storing said next instruction word only in a last memory bank with said particular sequence such that instruction words included within said first plurality of instructions are always stored only in a last memory bank included within said group of N memory banks for each one of said M prefetch elements, wherein only one instruction included within said first plurality of instructions is stored in said group of N memory bank;

in response to a selected prefetch element receiving a prefetch token, sequentially fetching said plurality of instruction words from said group of N memory banks utilizing said selected prefetch element wherein said fetching of one of said plurality of instruction words overlaps a portion of said fetching of another of said plurality of instruction words; and sequentially executing in program order said fetched plurality of instruction words utilizing said central processing unit in said data processing system.

16. The method for efficiently executing instructions in a central processing unit of a data processing system according to claim 15 wherein, during said step of coupling a group of N memory banks to each one of said M prefetch elements, a group of N memory banks is coupled to each one of said M prefetch elements wherein each one of said group of N memory banks has a serial output coupled to said one of said M prefetch elements for serially transferring selected bits that comprise a portion of said instruction words to said one of said M prefetch elements at the rate of one bit per said cycle time.

17. The method for efficiently executing instructions in a central processing unit of a data processing system according to claim 16 wherein, during said step of coupling a group of N memory banks to each one of said M prefetch elements wherein each one of said group of N memory banks has a serial output coupled to said one of said M prefetch elements for serially transferring selected bits that comprise a portion of said instruction words to said one of said M prefetch elements at the rate of one bit per said cycle time, a group of N video memories is coupled to each one of said M prefetch elements for serially transferring selected bits that comprise a portion of said instruction words to said one of said M prefetch elements at the rate of one bit per said cycle time.

18. The method for efficiently executing instructions in a central processing unit of a data processing system according to claim 16 wherein, during said step of sequentially storing a plurality of instruction words in each group of N memory banks, a plurality of N-bit instruction words are sequentially stored in program order in each group of N memory banks wherein each bit of an N-bit instruction word is stored in a corresponding one of said N memory banks.

19. The method for efficiently executing instructions in a central processing unit of a data processing system according to claim 16 wherein, during said step of sequentially fetching said plurality of instruction words from said group of N memory banks utilizing said selected prefetch element, selected bits comprising said plurality of N-bit instruction words are contemporaneously and serially fetched in program order from said group of N memory banks utilizing said selected prefetch element.

20. The method for efficiently executing instructions in a central processing unit of a data processing system according to claim 15 wherein, during said step of sequentially storing a plurality of instruction words in each group of N memory banks, a sequence of N instruction words is sequentially stored in program order in each group of N memory banks.

21. The method according to claim 15 wherein said first plurality of instructions are branch instructions.

* * * * *